Figure 4:
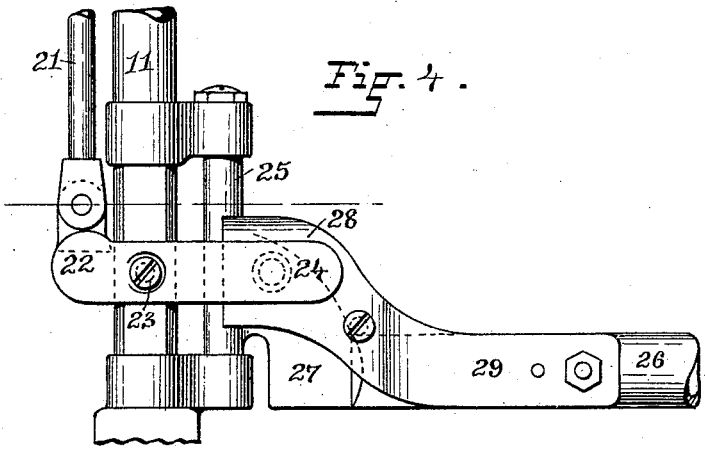

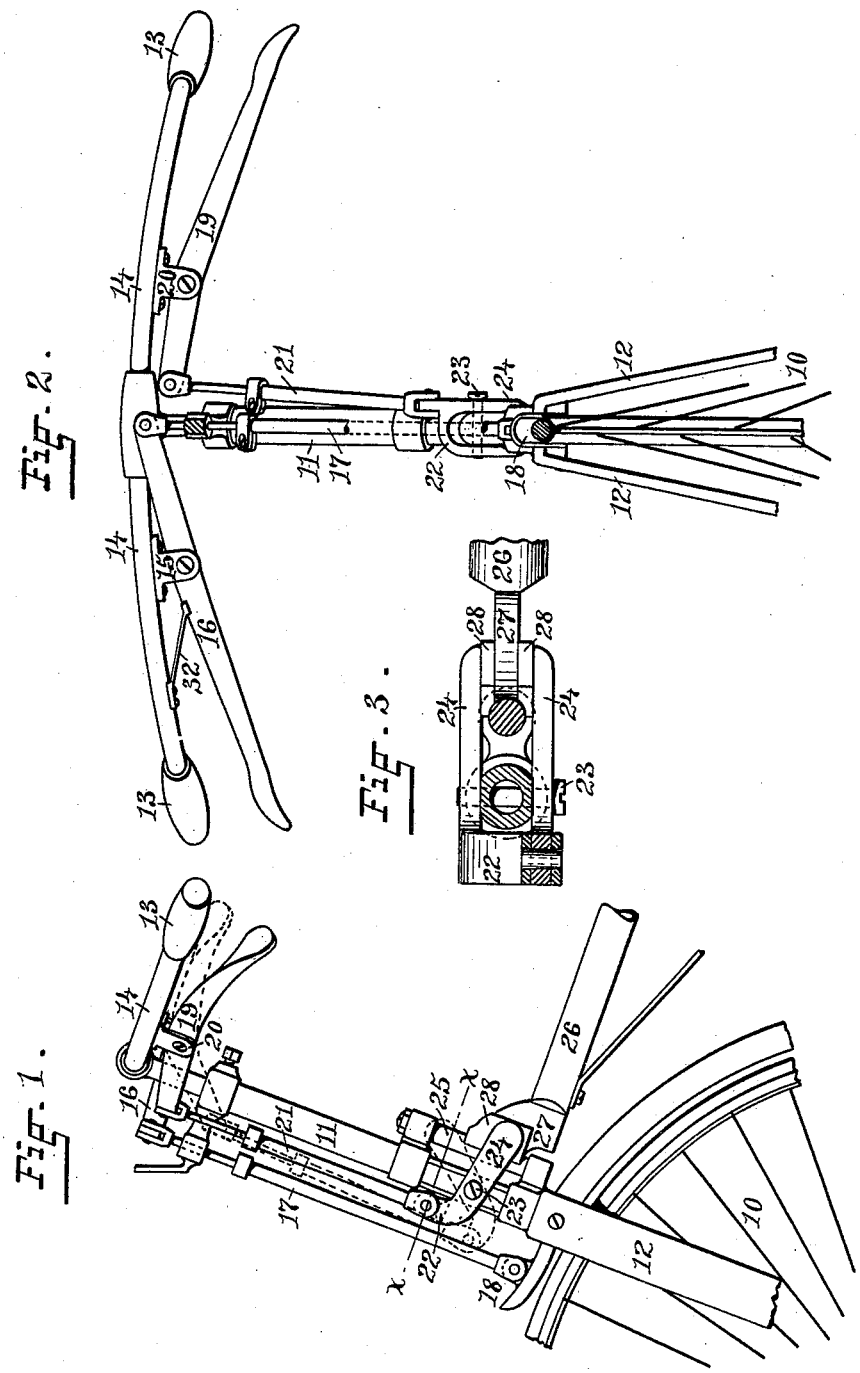

(No Model.) 2 Sheets—Sheet 2.

A. J. E. READIO.
VELOCIPEDE.

No. 420,416. Patented Jan. 28, 1890.

WITNESSES:
Chas. H. Luther Jr.
M. F. Bligh

INVENTOR:
Arthur J. E. Readio.
Joseph A. Miller & Co.
Attys.

UNITED STATES PATENT OFFICE.

ARTHUR J. E. READIO, OF PAWTUCKET, ASSIGNOR OF ONE-HALF TO JOSEPH A. MILLER, JR., OF PROVIDENCE, RHODE ISLAND.

VELOCIPEDE.

SPECIFICATION forming part of Letters Patent No. 420,416, dated January 28, 1890.

Application filed December 26, 1888. Serial No. 294,650. (No model.)

*To all whom it may concern:*

Be it known that I, ARTHUR J. E. READIO, of Pawtucket, in the county of Providence and State of Rhode Island, have invented certain new and useful Improvements in Velocipedes, of which the following is a full, clear, and exact description, reference being had to the accompanying drawings, forming part of this specification.

This invention has reference to an attachment for the class of vehicles in which the rider propels and guides the vehicle, consisting of the velocipede, which the rider propelled by touching the ground with his feet, the improved velocipede provided with crank-pedals, bicycles, tricycles, tandems, and other similar vehicles.

The invention consists in providing the steering-spindle with a clutch constructed to hold the steering-spindle and restrict its axial motion, as will be more fully set forth hereinafter.

In the class of vehicles referred to the rider propels the vehicle and its load with the feet, and also directs the course of the vehicle with the hands. The strain on his limbs and feet is relieved from time to time by the change of grade in the road in coasting down any descending grade, or allowing the vehicle to run down the incline without using the limbs and feet; but the strained and rigid position of the hands must be maintained to steer the vehicle down such incline.

The object of this invention is to relieve the rider of this continuous strain on the arms and hands, so that from time to time the rider may obtain rest, and thus travel greater distances with less fatigue.

In the drawings similar numbers of reference designate corresponding parts throughout.

Figure 5:
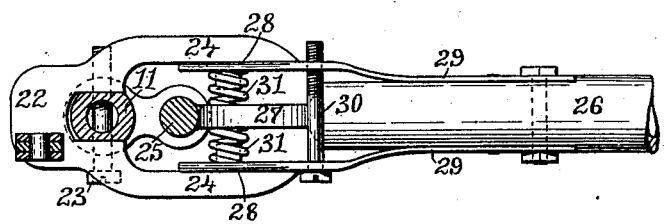

Figure 1 is a side view of the steering-spindle, showing part of a bicycle-wheel, the handles connected with the steering-spindle, the brake, the new clutch attachment, and its operating-lever in the locked position in solid lines and in the normal position in broken lines. Fig. 2 is a front view of the steering and brake mechanism, also showing the new clutch attachment and its operating-lever. Fig. 3 is an enlarged view through line *x x*, showing the clutch in connection with the steering-spindle and the frame. Fig. 4 is a side view of a modified form of the improved clutch, and Fig. 5 is a top view of the same.

In the drawings, 10 indicates the steering-wheel of a bicycle, velocipede, or any of the vehicles above referred to.

11 indicates the steering-spindle rigidly connected with or forming part of the fork 12. This fork 12 extends to the axle of the wheel 10, and, resting on the same, forms the support of the steering part of the vehicle.

13 13 are the handles formed on the bar 14, extending horizontally from the top of the steering-spindle 11. To the horizontal bar 14, on one side of the steering-spindle, the fulcrum 15 is secured, and in the same the lever 16 is pivotally secured, and to the end of the lever 16 nearest the steering-spindle 11 the vertical connecting-rod 17 connects this end of the lever 16 with the brake 18. The spring 32, acting on the outer arm of the lever 16, acts to hold the brake 18 off from the rim of the wheel 10 until the brake is depressed by raising the outer arm of the lever 16.

The device which forms the subject-matter of this invention is operated by the lever 19 similar to the lever 16, pivotally secured in the fulcrum 20, secured to the steering-bar 14 on the opposite side of the steering-spindle 11. The connecting-rod 21 is secured pivotally to the inner end of the lever 19 at its upper end and to the clutch 22 at its lower end. This clutch 22 preferably consists of a forked lever pivoted to the steering-spindle by the pin or screw 23. The arms 24 of the clutch 22 may be rigid, or they may be made so as to spring under strain, so as to allow a slight deflection of the steering-wheel caused by inequalities of the road and an automatic readjustment of the steering-wheel to a straight course.

The steering part of this class of vehicles is usually connected with the other part by means of the linchpin, or, as it is sometimes called, the "head-spindle" 25, turning in bearings secured to the steering-spindle 11. To the spindle 25 the reach-bar 26 is secured by the neck 27. On this neck 27, in one method of carrying out my invention, is formed or secured the cheek-pieces 28, against which the arms 24 of the clutch 22 bear, and thus keep the reach-bar 26, and with the same the running-gear, in alignment with the steering-wheel.

It is evident that instead of pivoting the clutch 22 on the steering-spindle it may be made to slide on the flattened side of the steering-spindle bodily and operated by the lever 19 to raise and lower the same. It is also evident that the clutch may be pivotally connected with the neck 27 and arranged so that when raised the steering-spindle will turn freely, and when lowered the clutch will bear against a flattened part of the steering-spindle or the forked extension 12.

Referring now to the modified form of my invention, (shown in Figs. 4 and 5,) the arms 24 of the clutch 22 are rigid and bear against the cheek-pieces 28, which form the ends of the springs 29, secured to the reach-bar 26. The tension of the springs 29 is adjusted by means of the bolt 30, by which the same can be more or less spread apart and held in the adjusted position, so that the cheeks 28 will bear with more or less force against the arms 24 of the clutch 22 and allow to the clutch secured to the steering-spindle sufficient motion to permit the steering-wheel to adjust itself to any inequality of the road and automatically regain the proper alignment.

To increase the power of the springs 29 to maintain the alignment, the coiled springs 31 may be inserted between the neck 27 and the springs 29. The upper part of the cheeks 28 are shown as curved, so as to allow the clutch to pass over the cheeks readily.

It is evident that various modifications may be made in the construction and application of the clutch, so that the rider may at any time secure the desired rest by connecting the steering-wheel with the running wheel or wheels of a velocipede-vehicle. I therefore do not herein confine my invention to the special constructions herein shown and described.

Having thus described my invention, I claim as new and desire to secure by Letters Patent—

1. In a velocipede, the combination, with the steering-spindle, the steering-handle, and the reach, of the lever 19, the connecting-rod 21, the forked arms 24, pivotally secured to the steering-lever, the neck 27, the spindle 25, and cheek-pieces 28, constructed to connect and disconnect the steering-spindle and the reach, as described.

2. The combination, with the spindle 11, the reach 26, neck 27, and spindle 25, of the springs 29, having the cheeks 28, and the adjustable clutch constructed to form a flexible connection between the reach and the steering-spindle, as described.

3. The combination, with the spindle 11, the reach 26, and the springs 29, provided with the cheeks 28, of the adjusting-screw 30 and a clutch arranged to connect and disconnect the steering-spindle and the reach, as described.

4. The combination, with the reach 26, springs 29, spindle 25, clutch 22, and the steering-spindle 11, of the coiled springs 31, as described.

In witness whereof I have hereunto set my hand.

ARTHUR J. E. READIO.

Witnesses:
JOSEPH A. MILLER,
JOSEPH A. MILLER, Jr.